Patented Apr. 12, 1949

2,466,925

UNITED STATES PATENT OFFICE 2,466,925

PROCESS OF MAKING METALLIC NAPHTHENATES AND SOAPS

Oscar C. Brauner, Boston, Mass., assignor, by mesne assignments, to Darworth, Inc., Simsbury, Conn., a corporation of Connecticut No Drawing. Application June 22, 1945,
Serial No. 601,083

6 Claims. (Cl. 260—429)

This invention relates to metallic salts of substantially water insoluble organic acids, such as naphthenic acid, oleic acid, abietic acid, and similar acids, and to the preparation of such compounds.

Metallic salts of this general character have been made by the so-called precipitation process; that is, by saponifying the organic acids with alkalis, for example, caustic soda or potassium carbonate, and then adding a metal compound, for example, a metallic oxide, inorganic metal salts or the like. In this process emulsions are formed which cannot be broken down easily, and special equipment or chemical treatment is required to finish the product satisfactorily. Another way of obtaining the same type of compound is by the fusion process whereby metallic oxides, carbonates or other suitable metallic salts are combined with substantially water insoluble organic acids by fusing a mixture thereof. The disadvantage of this process is that complete chemical combination does not always occur and, therefore, unreacted material is likely to cause sedimentation, sludge or turbidity, thereby decreasing the active metal content; namely, the amount of metallic soap which is soluble in organic solvents. This is particularly true when the metallic salts are added too quickly and do not have sufficient time to react completely or are not wetted readily by the acids. It is, therefore, desirable to bring the metallic salts in such a state where they can easily and quickly react with the above mentioned organic acids.

I have discovered that the above difficulties can be largely overcome by the fusion reaction of substantially water insoluble organic acids with a preformed mixture of the metallic compound and a basic nitrogen compound. The preformed mixture produces a Wernerian complex. The fusion reaction mass produced in accordance with the present invention is substantially completely soluble in the usual organic solvents, such as the aliphatic, aromatic, cyclic or hydrogenated hydrocarbons, ethers, esters, ketones, and similar solvents customarily used in the preparation of lacquers, varnishes, paints.

Illustrative examples of the organic acids which may be used in the practice of the invention are naphthenic acids, linolic, abietic, resinic, oleic, stearic, palmitic, resinolic, sebacic, phthalic and benzoic acids, either in their free state or in the form in which they are present in oils, for example, linseed oil, China-wood oil, red oil (normal crude oleic acid), perilla oil, tall oil, and similar oils, raw or modified by subsequent treatment.

As illustrative of basic nitrogen compounds I may mention aqueous ammonia, the alkyl, aryl and cyclic amines, such as propyl, dibutyl, and cyclo-hexyl amine, aniline, pyridine, di-n-hexyl amine, triethanol amine and also quaternary ammonium compounds, such as tetramethyl amine hydroxide.

The metallic oxides and salts which are capable of forming a Wernerian complex with basic nitrogen compounds, such as ammonia, pyridine and quaternary ammonium compounds, are well known. As illustrative of such metallic compounds are basic copper carbonate, zinc oxide, cadmium oxide, lead oxide, basic lead acetate, lead carbonate, nickel acetate, silver oxide and cobalt borate.

In the practice of the process of the invention, the organic acid is heated to and maintained at a temperature above the melting point of the metal salt to be formed. A metallic compound, such as basic copper carbonate, is thoroughly mixed and dispersed in aqueous ammonia or other basic nitrogen compound to form a paste-like mass. This preformed mixture then is added to the heated acid with continuous agitation, thereby forming a molten reaction mass in which substantially all of the metal has combined with the organic acid and which, when cooled, is substantially completely soluble in the usual organic solvents, such as the aliphatic, aromatic, cyclic and hydrogenated hydrocarbons and similar solvents used in the preparation of lacquers, paints and varnishes. These solvents may be used for thinning the metallic organic salts or soaps produced.

The metallic salts or soaps produced by the method described differ in certain physical and chemical properties from those prepared by other methods. For instance, they have a lower viscosity, faintly sweet odor and a different hue. These compounds are more nearly neutral than metallic soaps or naphthenates prepared by previously known methods. They also contain a small amount of combined nitrogen which I believe is present in the form of an imine as indicated by the following reaction. Thus, the preformed mixture of dry copper carbonate and a basic nitrogen compound may react as indicated by the following equation to form a Wernerian complex.

(1) 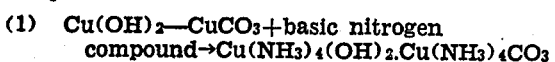

The Wernerian complex may then react with the organic acid to form a copper imino compound which may be represented by the following structural formula

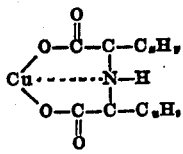

where $x$, $y$, $u$ and $v$ are integers.

I have found that the metallic salts of the invention which I call metallic imino soaps, or metallic imino naphthenates are stable on prolonged exposure to light and heat. Further, these compounds are more nearly neutral than metallic soaps or metallic naphthenates prepared by other methods which are usually acidic. The new compounds are also more fluid, and there is a marked decrease in the objectionable odor; in some cases even a sweetening of the odor.

Commercial uses for these new metallic imino soaps or metallic imino naphthenates are the the same as for metallic soaps and naphthenates made by other methods but it is clear that the properties mentioned above are a decided advantage for use in fungicides, mildew-proofing agents, and extreme pressure lubricants, where corrosion in contact with metals, fibres, and wood, is an important factor, or for use in driers and catalysts where it is desirable to avoid unfavorable reaction to basic materials.

The method of the invention may also be used in the preparation of mixed molecule ester metallic salts or soaps of the substantially water insoluble organic acids, such as copper phenyl naphthenate. In such a case the phenol is added to the molten mass after the preformed mixture of the inorganic metallic compound and the basic nitrogen compound has been added and reacted with the organic acid. In addition to phenol other hydroxy compounds of the phenolic type or alcohols having a boiling point above 150° C., preferably, between 170° C. and 240° C. As illustrative of other alcoholic compounds which may be used are xylenol, alpha phenyl ethyl alcohol, glycol, octanol-1, oleyl alcohol, the decyl alcohols, such as decanol-1, decanol-4, 4-propyl heptanol.

Example 1

For a solution which will contain copper naphthenate having a metal content of 8%, 75 parts by weight of naphthenic acid with an acid number of 200, is heated to a temperature of 220° F. In the meantime, a premix is made by mixing 14.5 parts by weight of basic copper carbonate and 7.3 parts by weight of aqueous ammonia of 26° Bé. It is preferable to add the copper carbonate gradually to the aqueous ammonia. When the naphthenic acid has reached the temperature of 220° F. the premix is then added gradually with constant agitation and the temperature raised to 300° F. By this process a complete reaction can be obtained in about an hour, compared with three to four hours required by the usual fusion process. The amount of unreacted copper is practically nil, whereas approximately 4% unreacted copper is left as a sediment in the usual fusion process. When the reaction has been completed the material is allowed to cool to 180°–200° F. at which temperature 18 parts of mineral spirits is added with constant agitation, thus resulting in the final product as mentioned above. This product contains 0.55 per cent nitrogen as determined by the Kjeldahl and also by the Dumas method. The nitrogen is chemically combined in the product since the temperature used in its preparation would drive off any uncombined nitrogen.

Example 2

Naphthenic acid 75 parts, copper carbonate 14.6 parts, mineral spirits 18 parts, cyclo-hexyl-amine 12.6 parts, water 25 parts. The procedure is similar to Example 1, the only difference being that cyclo-hexyl-amine and water is used to replace the ammonia in the premix of Example 1.

Example 3

Same as Example 1 except that one part of zinc oxide is used with each 0.35 part of aqueous ammonia of 26° Bé.

Example 4

35 parts of naphthenic with an acid number of 210 and 35 parts of red oil are heated to a temperature of 220° F. In the meantime, a premix is made by mixing 14.6 parts of copper carbonate with 2.2 parts of aqueous ammonia of 25° Bé., 2.2 parts mineral spirits and 8.8 parts of water. The procedure then is the same as described in Example 1.

Example 5

|  | Parts |
|---|---|
| Fish oil fatty acids, with an acid number of 175 | 57 |
| Zinc oxide | 5 |
| Phenol USP | 5 |
| Fuel oil | 15 |
| Mineral spirits (Stoddard) | 35 |
| Aqua ammonia | 1¼ |
| Tap water | 9 |

50 parts of the fatty acids and all of the fuel oil are heated to a temperature of 240° F. in a suitable kettle or tank. In the meantime, a premix is made from 7 parts of the fish oil fatty acids, all of the water, all of the ammonia, 9 parts of the mineral spirits and all of the zinc oxide. This preformed mixture then is added to the contents of the kettle when the latter has reached a temperature of 240° F. When the premix has reacted with the fatty acids to form a zinc soap, the temperature is raised to about 300° F. and the phenol in molten form is added with strong agitation. This temperature is maintained for between one to three hours in order to esterify the phenol with the unreacted acid. The material is allowed to cool to 180° to 200° F. and the rest of the mineral spirits is added. The metal content of the preformed soap acts as a catalyst to speed up the process of esterification. The viscosity is greater or less than the plain metallic soap, depending upon the nature of the alcohol used. For instance, in the case of the phenol mixed esters, the viscosity is lower.

I claim:

1. In the fusion process of preparing metallic salts of substantially water insoluble organic acids, wherein the reaction is brought about in a molten mixture of the organic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed.

2. In the fusion process of preparing metallic salts of naphthenic acids, wherein the reaction is brought about in a molten mixture of the naphthenic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed.

3. In the fusion process of preparing metallic salts of substantially water insoluble organic acids, wherein the reaction is brought about in a molten mixture of the organic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed, and thereafter adding in molten condition to the molten mass a compound from the group consisting of an alcohol having a boiling point above 150° C., and a hydroxy compound of the phenolic type.

4. In the fusion process of preparing metallic salts of naphthenic acids, wherein the reaction is brought about in a molten mixture of the naphthenic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed, and thereafter adding in molten condition to the molten mass a compound from the group consisting of an alcohol having a boiling point above 150° C., and a hydroxy compound of the phenolic type.

5. In the fusion process of preparing metallic salts of substantially water insoluble organic acids, wherein the reaction is brought about in a molten mixture of the organic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed, and thereafter adding phenol in molten condition to the molten mass.

6. In the fusion process of preparing metallic salts of naphthenic acids, wherein the reaction is brought about in a molten mixture of the naphthenic acid and the metallic compound, the improvement which comprises the step of adding a preformed mixture of a basic nitrogen compound selected from the class consisting of ammonia, amines, basic nitrogen heterocyclic compounds and quaternary derivatives of the three preceding types, with a metallic compound capable of forming a Werner complex with said basic nitrogen compound, to the molten acid while maintaining the acid at a temperature above the melting point of the metallic salt to be formed, and thereafter adding phenol in molten condition to the molten mass.

OSCAR C. BRAUNER.

REFERENCES CITED

The following references are of record in the file of this patent:

UNITED STATES PATENTS

| Number | Name | Date |
| --- | --- | --- |
| 1,884,407 | Romaine | Oct. 25, 1932 |
| 2,036,916 | Bruson | Apr. 7, 1936 |
| 2,157,727 | Baker | May 9, 1939 |
| 2,188,746 | Bersworth | Jan. 30, 1940 |
| 2,229,511 | Long | Jan. 21, 1941 |
| 2,274,058 | Goebel et al. | Feb. 24, 1942 |
| 2,294,525 | Waugh | Sept. 1, 1942 |
| 2,279,138 | Henke | Apr. 7, 1942 |
| 2,335,101 | Belzer | Nov. 23, 1943 |

FOREIGN PATENTS

| Number | Country | Date |
| --- | --- | --- |
| 356,192 | Great Britain | Aug. 27, 1931 |